Jan. 2, 1940.     F. A. BROWNE     2,185,973
CONVEYING MECHANISM
Filed Dec. 23, 1938     2 Sheets-Sheet 1
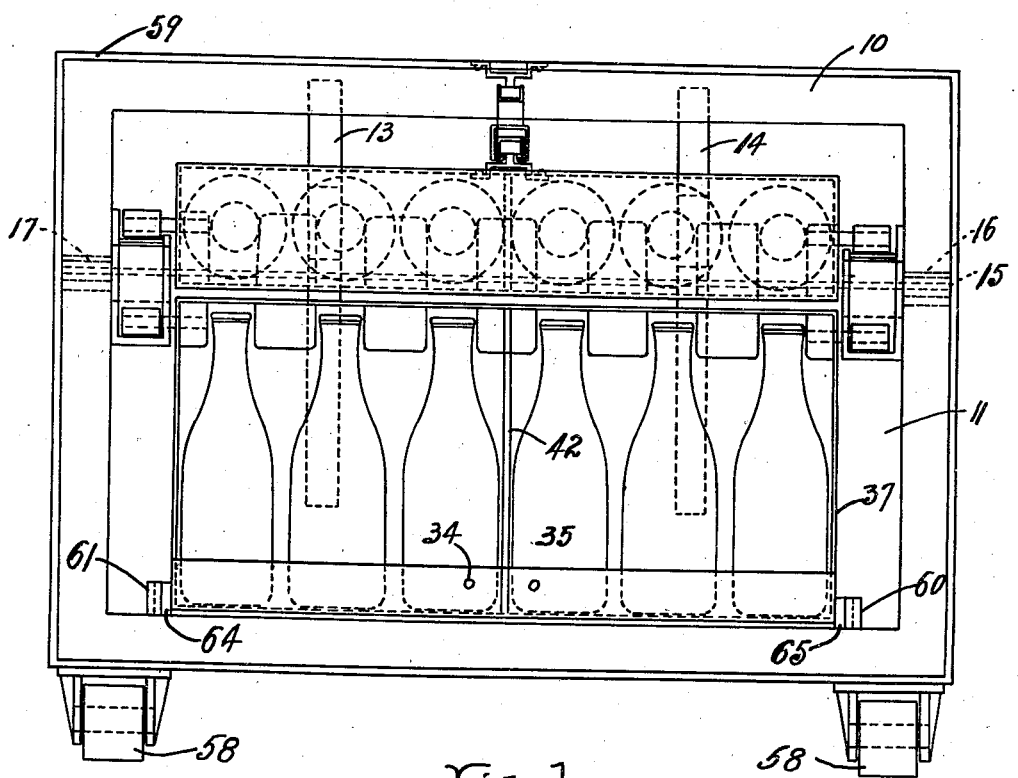
Fig. 1.
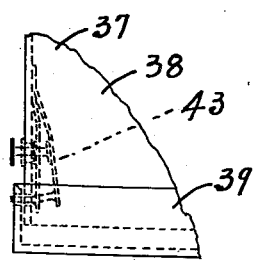
Fig. 5.
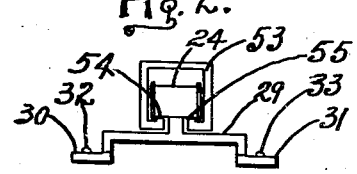
Fig. 2.
Fig. 3.
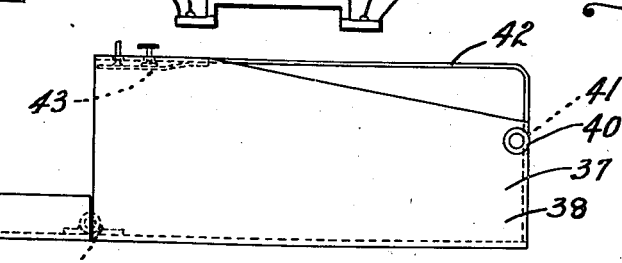
Fig. 4.
INVENTOR.
Floyd A. Browne.
BY Lawler & Lawler.
ATTORNEYS

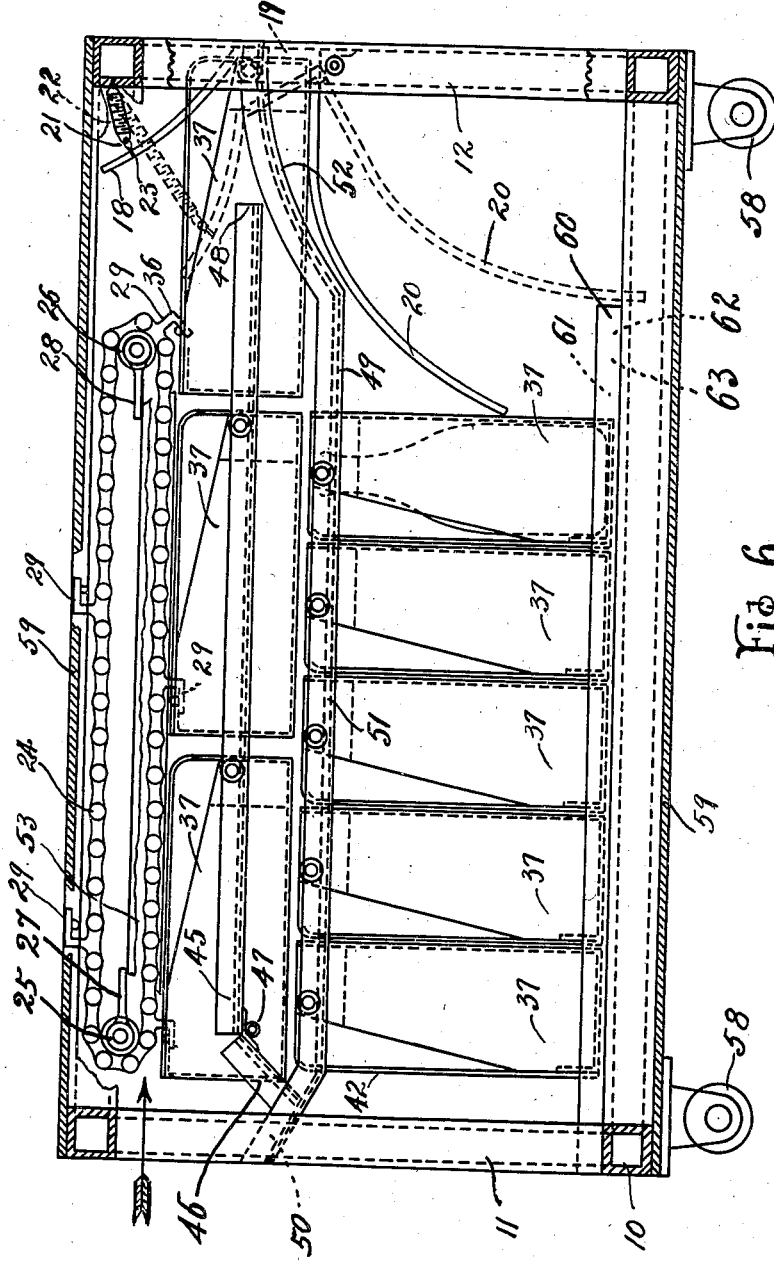

Patented Jan. 2, 1940

2,185,973

UNITED STATES PATENT OFFICE 2,185,973

CONVEYING MECHANISM

Floyd A. Browne, Cleveland, Ohio, assignor of one-half to J. D. Overholt, Wooster, Ohio Application December 23, 1938, Serial No. 247,411

3 Claims. (Cl. 198—1)

This application is related to and is in the nature of an improvement embodying certain improvements over my previous invention of a similar nature disclosed and claimed in United States Letters Patent No. 2,158,781 of May 16, 1939.

The invention relates to a conveying mechanism more particularly as applied to a milk delivery system and the like, in which the material conveyed is manually emptied or unloaded from the receptacles. The receptacle is then refilled with empty containers such as milk bottles etc., and finally manually placed in another plane, leaving the next receptacle in place with its contents for subsequent delivery or deliveries.

According to the invention, when the conveying mechanism is loaded at the plant or dairy, all the receptacles are filled with products to be delivered to the respective customers. Some of the receptacles are placed in close side-by-side relation in a vertical position, while others are placed end-to-end in a horizontal position, so that all the receptacles are utilized. The conveying mechanism or a plurality of them may be then assembled in a unitary structure and removably mounted in a truck or milk wagon adapted to receive the same.

The objects and advantages of the invention will become apparent as the description progresses.

In the accompanying drawings forming part of this specification, and in which like reference characters are employed to designate corresponding parts throughout the same.

Figure 1 is an end view of the conveying mechanism showing the receptacles in both the vertical and horizontal positions.

Figure 2 is a fragmentary end view showing a roller type of actuator, the chain being supported to eliminate slack by guideway through which it passes.

Figure 3 is a fragmentary view of steel tape, with a coupling attached thereto that may be used in place of chain if desired.

Figure 4 is a side view of the receptacle showing same in open position, and also showing the locking means to hold the receptacle in close position.

Figure 5 is a fragmentary view of a receptacle showing the receptacle in closed position.

Figure 6 is a side view of the conveying mechanism partly in elevation and partly in section. The bottles are shown in but one of the receptacles.

Referring to the drawings, wherein for the purpose of illustration 10 generally designates the frame of the conveying mechanism.

The frame which in the present example is of elongated rectangular form embodies a front opening 11, and a rear portion 12 equipped with an independent automatically controlled positioning and guiding means.

The positioning and guiding means consists of two spaced unitary acting members 13 and 14 fixed to the transverse shaft 15, which shaft is journalled on the frame as at 16 and 17. The spaced members 13 and 14 each comprises three sections namely: the upper arcuately formed section 18, the section 19 adapted to limit the travel of the receptacle previous to its release from the endless actuator, and the positioning section 20, that positions the receptacle after its release, in its proper vertical position. It will be understood that members 13 and 14 are integral members. The positioning and guiding means are controlled by means of helical springs 21 and 22, each spring having one end attached adjacent the end of the arcuately formed section 18, as at 23, while the opposed or outer end is secured to the frame.

In the upper portion of the frame, intermediate its width, there is provided an endless manually operated actuator 24 trained over spaced sprocket wheels 25 and 26 held in spaced relationship by brackets 27 and 28 in which they are rotatably journalled.

On the endless actuator there is provided spaced bifurcated coupling instrumentalities 29, 29.

An end view of the bifurcated coupling means and its relation to and with actuator is shown in Figure 2. The furcations are shown at 30 and 31 each having a protuberance thereon as at 32 and 33 adapted to engage in apertures 34 and 35, provided in the receptacle to receive the same. The coupling means engage the receptacle intermediate its width, and is released therefrom by being carried around the sprocket wheel as shown at 36 in Figure 6. It will be understood that when the actuator is manually actuated it moves in the direction indicated by the arrow in Figure 6.

The receptacles 37, 37 are each identical in structure so that a description of one will suffice for all. The receptacle is of composite structure and consists of a body portion 38 and a base portion 39. The body portion is provided with oppositely positioned wheels 40 and 41, a handle 42 and a spring latch 43 adapted to latch the bottom with the body portion. The body portion and the base portion are hinged together by means of a hinge or hinges 44.

The track arrangement in the supporting structure or frame, are of the same construction save that one is a right and the other is a left, a detailed description of one will, it is believed, suffice, and reference is now made for that purpose to Figure 6. Each track comprises an upper rail portion 45 having at one end thereof, an inclined section 46 hinged thereto by means of a hinge 47. The inclined section connects the upper rail with the lower rail and acts as a switch. The upper rail stops short of the length of the supporting structure as at 48.

It will be noted that where the rollers supporting the forward end of the receptacle leave the end of the upper track, there is a distinct break or opening between the upper and lower track. The forward end of the receptacle is supported across this gap or opening by means of that portion of the independent acting means positioned in its path and over which it slides and which normally prevents deflection of the forward end of the receptacle, until its rollers again engage the extending curved portion of the lower track.

The lower track 49 extends the full length of the supporting structure and comprises a sectionalized track consisting of three sections 50, 51 and 52. The section 50 is inclined upward and provides a foundation for the hinged inclined portion of the upper track, and is also adapted to prevent the receptacles in the lower track from becoming disengaged therefrom in the operation of same. The section 51 is spaced parallel with the upper rail and carries the receptacles in the vertical position. The section 52 is of arcuate configuration as shown and terminates with the length of the supporting structure. It will be noted that when the receptacle is released from the endless actuator the upper arcuately formed section 18 of the guiding and positioning members 13 and 14, cause the wheels on the receptacle to follow the curved track while the receptacle is being properly positioned vertically. After the receptacle has been automatically positioned the positioning and guiding means is returned to inactive position by the helical springs 21 and 22.

The endless actuator passes through a supporting member 53, adapted to prevent slack in the chain so that the horizontally positioned receptacles will not infringe upon the clearance dimensions above the vertically positioned receptacles in the device. The guideway is provided with laterally spaced upturned edges 54 and 55, so arranged that the rollers in the chain may roll along same thus eliminating the use of jockey wheels to overcome the slack in the chain.

In Figure 3 is a fragmentary view of tape type of drive, the tape is shown at 56, the coupling means being operatively associated therewith as substantially as shown. The position of the coupling means on being released is shown in the chain line 57. The device is provided with rollers 58, 58, 58, 58, and is properly insulated with insulation 59. In the supporting structure there is provided oppositely arranged longitudinally extending guiding members 60 and 61. The ends 62 and 63 of same are beveled to permit easy entry of the members 64 and 65 fast on the receptacle that frictionally engage same. The members on the receptacle are adapted to keep the receptacle in proper spaced relation in the device so that it will not bind, as it is moved through the length of the conveying mechanism.

When the products contained in the first vertical receptacle have been delivered, and the space formerly occupied thereby refilled with empty containers, such as milk bottles, the receptacle is manually pulled forward, and as it is pulled, the rollers at the upper end of the receptacle, engages the inclined portion hinged on the forward end of the upper track that extends down to meet the lower trackway, and lifts the same and passes therebeyond. The hinged inclined portions then return to normal position by gravity. The receptacle is then manually forced up the incline into the upper track, where it engages the bifurcated coupling on the endless actuator, which cooperates with the track to jointly support the receptacle in the horizontal position in definite spaced relationship to and with the receptacle immediately in advance thereof. When the receptacle furthest remote from the incoming receptacle is released from the bifurcated coupling on the endless actuator it is guided and positioned automatically by controlled independently acting means that position it in its proper place in the vertical position. The receptacle may be removed from the device for the purpose of cleaning and repairs.

While I have herein shown and described a preferred arrangement it will be readily understood that changes and modifications therein may be found desirable or essential in meeting the various exigencies of use, and I desire to be understood as reserving the right to make any and all such changes or modifications as may be found desirable or essential, in so far as the same may fall within the spirit and scope of the invention as expressed in the accompanying claims when broadly construed.

Having thus described my invention, what I claim is:

1. A device of the class described comprising a supporting structure, oppositely positioned tracks therein, an upper longitudinally extending level track having at one end thereof an inclined hinged switching means, a sectionalized lower track comprising an upwardly inclined end portion, a longitudinally extending level portion in parallelism with the upper level track and an arcuate upwardly extending end portion, the hinged inclined switching means adapted to rest upon the lower track, a medially situated longitudinally extending guideway fixed to the supporting structure and above the upper track, brackets fixed to the guideway, sprocket wheels supported and journaled in the aforesaid brackets, an endless actuator guided through the guideway and supported thereby and trained over the sprocket wheels, bifurcated coupling means operatively associated with the endless actuator in spaced relationship therearound on the outer periphery thereof and adapted to be independently releasably connected to a receptacle, an independently controlled guiding and positioning means positioned at the end of and in the supporting structure, a plurality of receptacles having oppositely positioned rollers, some of the aforesaid plurality of receptacles being positioned horizontally in the upper track and being jointly supported through the instrumentality of the endless actuator and the rollers on the track, while others of the said plurality are supported by the rollers on the lower track, the independent guiding and positioning means being actuated by a released receptacle from the endless actuator, the released receptacle being automatically positioned in a vertical position through said actuation of the said guiding and positioning means, and means to return the aforesaid previously functioning guiding and positioning means automatically to inactivity.

2. A device of the class described comprising a supporting structure, oppositely positioned tracks therein, an upper longitudinally extending level track having at one end thereof an inclined hinged switching means, a sectionalized lower track comprising an upwardly inclined end portion, a longitudinally extending level portion in parallelism with the upper level track and an arcuate upwardly extending end portion, the hinged inclined switching means adapted to rest upon the lower track, a medially situated longitudinally extending guideway fixed to the supporting structure and above the upper track, brackets fixed to the guideway, wheels supported and journaled in the aforesaid brackets, an endless actuator guided through the guideway and supported thereby and trained over the wheels, coupling means operatively associated with the endless actuator in spaced relationship therearound on the outer periphery thereof and adapted to be independently releasably connected to a receptacle, an independently controlled guiding and positioning means positioned at the end of and in the supporting structure, a plurality of receptacles having oppositely positioned rollers, some of the aforesaid plurality of receptacles being positioned horizontally in the upper track and being jointly supported through the instrumentality of the endless actuator and the rollers on the track, while others of the said plurality are supported by the rollers on the lower track, the independently guiding and positioning means being actuated by a released receptacle from the endless actuator, the released receptacle being automatically positioned in the vertical position through said actuation of the guiding and positioning means, and means to return the aforesaid previously functioning guiding and positioning means automatically to inactivity.

3. A device of the class described comprising a supporting structure, oppositely positioned tracks therein, an upper longitudinally extending level track having at one end thereof an inclined hinged switching means, a sectionalized lower track comprising an upwardly inclined end portion, a longitudinally extending level portion in parallelism with the upper level track and an upwardly extending end portion, the hinged inclined switching means adapted to rest upon the lower track, a medially situated longitudinally extending guideway fixed to the supporting structure and above the upper track, brackets fixed to the guideway, sprocket wheels supported and journaled in the aforesaid brackets, an endless actuator guided through the guideway and supported thereby and trained over the sprocket wheels, coupling means operatively associated with the endless actuator in spaced relationship and adapted to be independently releasably connected to a receptacle, an independently controlled guiding and positioning means positioned at the end of and in the supporting structure, a plurality of receptacles having oppositely positioned rollers, some of the aforesaid plurality of receptacles being positioned horizontally in the upper track and being jointly supported through the instrumentality of the endless actuator and the rollers on the track, while others of the said plurality are supported by the rollers on the lower track, the independent guiding and positioning means being actuated by a released receptacle from the endless actuator, the released receptacle being automatically positioned in a vertical position through said actuation of the said guiding and positioning means, and means to return the aforesaid previously functioning guiding and positioning means automatically to inactivity.

FLOYD A. BROWNE.